US011323330B1

(12) United States Patent
Chang et al.

(10) Patent No.: US 11,323,330 B1
(45) Date of Patent: May 3, 2022

(54) VALIDATING NETWORK TOPOLOGIES

(71) Applicant: Juniper Networks, Inc., Sunnyvale, CA (US)

(72) Inventors: Amy Chang, Sunnyvale, CA (US); Lisa M. Beam, San Jose, CA (US); Amol Sood, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/455,098

(22) Filed: Jun. 27, 2019

(51) Int. Cl.
*G06F 13/00* (2006.01)
*H04L 41/12* (2022.01)
*H04L 41/22* (2022.01)
*H04L 41/14* (2022.01)

(52) U.S. Cl.
CPC ............. *H04L 41/12* (2013.01); *H04L 41/14* (2013.01); *H04L 41/22* (2013.01)

(58) Field of Classification Search
CPC ......... H04L 41/12; H04L 41/14; H04L 41/22; H04L 45/02; H04L 47/829; G06F 11/3048
USPC ................ 709/226, 224, 223, 249; 718/104; 715/734–737, 969, 965
See application file for complete search history.

(56) References Cited

U.S. PATENT DOCUMENTS

| | | | | |
|---|---|---|---|---|
| 6,477,572 B1* | 11/2002 | Elderton | ............. | H04L 41/0893 709/224 |
| 9,300,554 B1* | 3/2016 | Kosai | .................... | G06F 40/186 |
| 9,621,443 B2* | 4/2017 | Kosai | .................. | H04L 43/0876 |
| 9,684,527 B1* | 6/2017 | Hayward | ............ | G06F 9/44505 |
| 9,705,921 B2* | 7/2017 | Voit | ........................ | H04L 63/20 |
| 9,823,937 B1* | 11/2017 | Hayward | ............ | G06F 9/44505 |
| 10,310,962 B2* | 6/2019 | Munoz Sanchez | ... | G06F 21/566 |
| 10,958,506 B2* | 3/2021 | Pignataro | ................ | H04L 47/24 |
| 2015/0304355 A1* | 10/2015 | Voit | ........................ | H04L 63/20 726/1 |
| 2016/0380851 A1* | 12/2016 | Kosai | ................ | G06F 16/24578 715/735 |
| 2017/0220449 A1* | 8/2017 | Munoz Sanchez | ... | G06F 21/566 |
| 2018/0276266 A1* | 9/2018 | Diwakar | ............ | H04L 43/0811 |
| 2019/0182103 A1* | 6/2019 | Pignataro | ................ | H04L 41/16 |
| 2020/0274766 A1* | 8/2020 | Notari | ................ | H04L 41/0873 |
| 2020/0351164 A1* | 11/2020 | Nathaniel | ........... | H04L 41/0806 |

(Continued)

FOREIGN PATENT DOCUMENTS

WO 2013184846 A1 12/2013

*Primary Examiner* — Kenneth R Coulter
(74) *Attorney, Agent, or Firm* — Shumaker & Sieffert, P.A.

(57) ABSTRACT

In general, the disclosure describes techniques for a hybrid diagramming application to provide a flexible network diagramming environment while also ensuring that the rules of the network are not violated. A service provider defines rules for various network objects, where the rules define where the various network objects can reside in the network topology, as well as how the various devices can be connected. A computing device executing the application receives an indication of user input assigning a first network device to a first area network in a network topology. The computing device validates, based on one or more characteristics of the first network device, that the first network device does not violate one or more rules for the first area network. The computing device, responsive to validating the first network device, generates a graphical user interface of the network topology and outputs, for display, the graphical user interface.

18 Claims, 13 Drawing Sheets

(56) References Cited

U.S. PATENT DOCUMENTS

2020/0412763 A1* 12/2020 Mercian .................. H04L 41/12
2021/0044484 A1*  2/2021 Huang  .................... H04L 41/12

* cited by examiner

VALIDATING NETWORK TOPOLOGIES

TECHNICAL FIELD

The disclosure relates to computer networks.

BACKGROUND

Over the last few decades, the Internet has grown exponentially from a small network comprising of few nodes to a worldwide pervasive network that services more than a billion users. Today, individual subscribers are not limited to running a few network sessions with voice and/or data downloads over the network. Instead, the extent of services used by subscribers varies widely from multimedia gaming, audio and video streaming, web services, voice over IP (VoIP), and the like. With the increased number of devices and possibilities within any given network, designing these networks has become an increasingly difficult task. Network diagrams can be generated using specialized tools, which use network discovery protocols in order to generate a static topology and monitor the network. Network diagrams can also be created in generic drawing tools.

SUMMARY

In general, the disclosure describes techniques for a hybrid diagramming application to provide a flexible network diagramming environment while also ensuring that the rules of the network are not violated. Initially, a service provider defines rules for various network objects, including area networks and network devices, where the rules define where the various network objects can reside in the overall network topology, as well as how the various devices can be connected upon being placed within the network topology. The service provider may generate templates of configurations of multiple network objects for use by the end user, or the end user may place network objects individually within the user interface in places corresponding to different parts of the network topology. Whenever the end user places network objects in the user interface, a computing device executing the hybrid diagramming application may verify that none of the rules defined by the service provider, as well as any additional rules created by the end user, are violated by the placement of the network object at the particular location within the network topology. Invalid placements may cause the computing device to output an invalidity indication that indicates which rules was broken. Valid placements may be presented within the graphical user interface. If other network objects are also validly present within the network topology, the computing device can additionally and automatically output a connection between the network devices such that the graphical user interface depicts a valid connection between the devices based on the various aspects of the devices and their locations. Additionally, these techniques may provide an end-to-end service for the user, enabling the user to publish their valid network topology for physical implementation while also generating a bill of materials list needed to implement the physical implementation into the user's system.

The techniques described herein may simplify building and visualizing a network topology. These techniques add a layer of behavior to guide the design of a network or site rather than provide a freeform canvas where users may make mistakes diagramming their network. By providing the drawing functionality, the techniques described herein enable end users to define the boundaries of a topology. Additionally, the techniques described herein define topology logic, and accepts user defined topology logic, in order to define validation for device placement. These techniques provide a computing device with a library of reusable topology layouts and rules, and the defined behavior logic can be integrated with device discovery features in order to automatically place discovered devices. By providing the freedom to build custom network layouts while also providing guidance and a set of rules to ensure valid design, the techniques described herein provide a valuable balance to automated tools and generic drawing tools, providing more freedom than automated tools while reducing user errors prevalent in the generic drawing tools. As such, these techniques may require less user input than generic drawing tools, as errors are pointed out rather than accepted, reducing the overall processing power. Further, these techniques may provide greater flexibility than automated tools, enabling these techniques to fit the needs of more users and their various network requirements.

In one example of the techniques described herein, a method is described, the method including, receiving, by a computing device, an indication of user input assigning a first network device to a first area network in a network topology. The method further includes validating, by the computing device and based on one or more characteristics of the first network device, that the first network device does not violate one or more rules for the first area network. The method also includes, responsive to validating the first network device, generating, by the computing device, a graphical user interface that includes at least a graphical indication of the first network device, a graphical indication of the first area network, a graphical indication of a second network device in the network topology, and a graphical indication of a connection between the first network device and the second network device, and outputting, by the computing device, and for display on a display device, the graphical user interface.

In another example of the techniques described herein, a device is described. The network device includes a memory configured to store one or more rules. The device also includes one or more processors in communication with the memory. The one or more processors are configured to receive an indication of user input assigning a first network device to a first area network in a network topology. The one or more processors are further configured to validate, based on one or more characteristics of the first network device, that the first network device does not violate one or more rules for the first area network. Responsive to validating the first network device, the one or more processors are also configured to generate a graphical user interface that includes at least a graphical indication of the first network device, a graphical indication of the first area network, a graphical indication of a second network device in the network topology, and a graphical indication of a connection between the first network device and the second network device, output, for display on a display device, the graphical user interface.

In another example of the techniques described herein, a non-transitory computer-readable storage medium is described, the non-transitory computer-readable storage medium storing instructions thereon that when executed cause one or more processors of a device to receive an indication of user input assigning a first network device to a first area network in a network topology. The instructions further cause the one or more processors to validate, based on one or more characteristics of the first network device, that the first network device does not violate one or more rules for the first area network. Responsive to validating the first network device, the one or more processors are also configured to generate a graphical user interface that includes at least a graphical indication of the first network device, a graphical indication of the first area network, a graphical indication of a second network device in the network topology, and a graphical indication of a connection between the first network device and the second network device, and output, for display on a display device, the graphical user interface.

In another example of the techniques described herein, a method is described, the method including, defining, by a computing device, one or more rules for each of one or more network objects defining a valid placement within a network topology for the respective network object. The method further includes creating, by the computing device, a network topology template including at least one of the one or more network objects. The method also includes publishing, by the computing device, the network topology template to a server for reference by a network development application.

In another example of the techniques described herein, a device is described. The network device includes a memory. The device also includes one or more processors in communication with the memory. The one or more processors are configured to define one or more rules for each of one or more network objects defining a valid placement within a network topology for the respective network object. The one or more processors are further configured to create a network topology template including at least one of the one or more network objects. The one or more processors are also configured to publish the network topology template to a server for reference by a network development application.

In another example of the techniques described herein, a non-transitory computer-readable storage medium is described, the non-transitory computer-readable storage medium storing instructions thereon that when executed cause one or more processors of a device to define one or more rules for each of one or more network objects defining a valid placement within a network topology for the respective network object. The instructions further cause the one or more processors to create a network topology template including at least one of the one or more network objects. The one or more processors are also configured to publish the network topology template to a server for reference by a network development application.

The details of one or more examples are set forth in the accompanying drawings and the description below. Other features, objects, and advantages will be apparent from the description and drawings, and from the claims.

DETAILED DESCRIPTION

Figure 1:
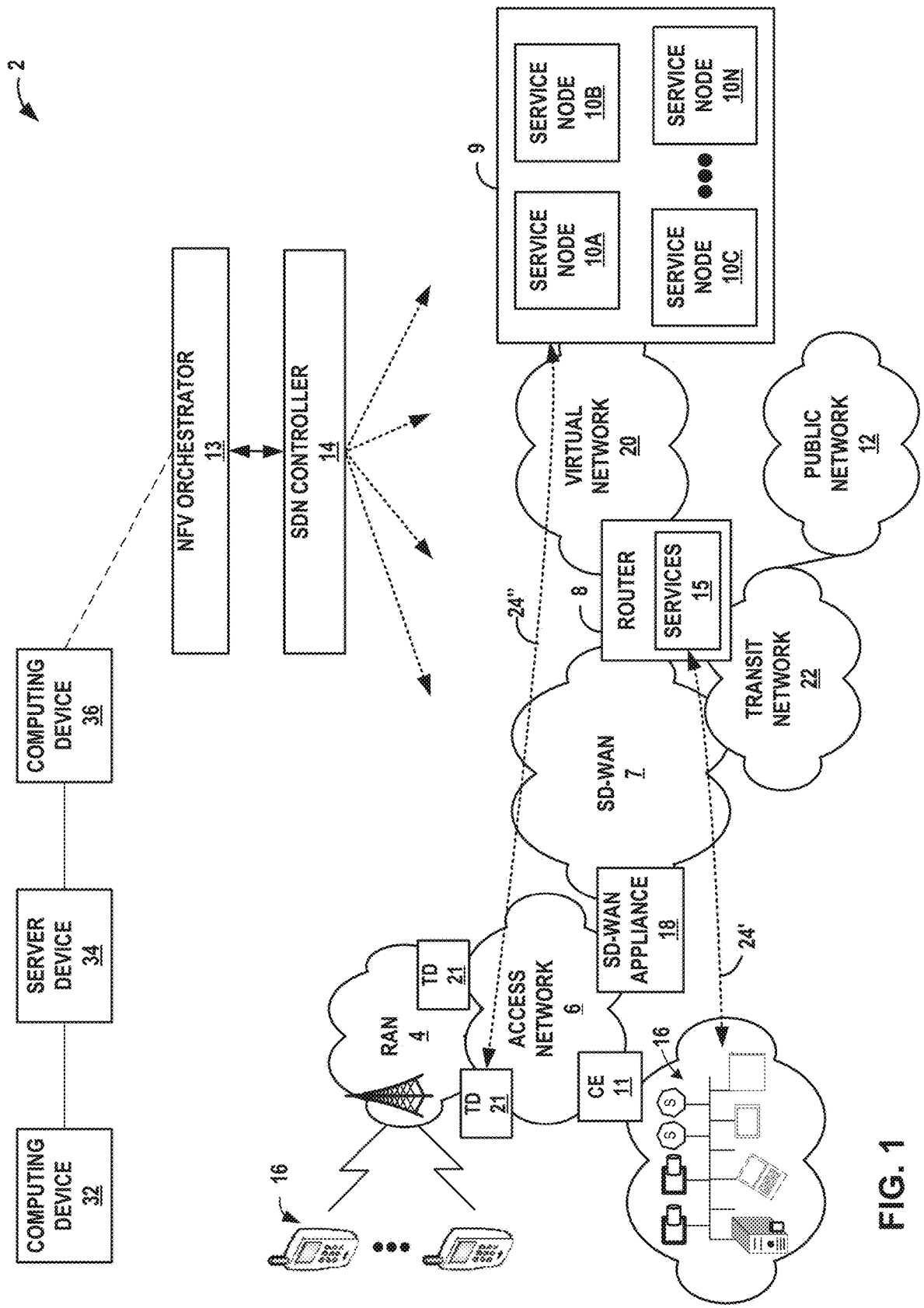
FIG. 1 is a block diagram illustrating an example software-defined wide area network system that includes one or more devices configured to perform the network topology generation techniques of this disclosure.

FIG. 1 is a block diagram illustrating an example system 2 that includes one or more devices configured to perform the network topology generation techniques of this disclosure. The example network system of FIG. 1 includes a SD-WAN system that operates as a private network to provide packet-based network services to subscriber devices 16. That is, SD-WAN system 2 provides authentication and establishment of network access for subscriber devices 16 such that a subscriber device may begin exchanging data packets with public network 12, which may be an internal or external packet-based network such as the Internet.

As described below, even simple examples of SD-WAN systems may be complicated and include multiple different area networks (e.g., RAN 4, access network 6, SD-WAN 7, transit network 22, public network 12, and virtual network 20). This increases the difficulty of arranging the networks and the various network devices and connections between network devices needed to implement every aspect of the system. Further, as each area network and each device within the area network could be customized in any number of ways and still be viable, automatically providing the user with only a single configuration of the various area networks may be ineffective, or even impossible, for the given situation.

This disclosure introduces techniques that provide an end-to-end design-to-deployment solution for managing any number of different types of network topologies, including SD-WANs. The end-to-end process for deploying a network broadly involves the following steps: planning and design, procuring devices, activating and configuring devices, monitoring, and configuring capabilities and security policies. Within this end-to-end solution, the techniques described herein provide one of the steps, which is to help users plan and design their network topology. The techniques described herein provide guidance for designing a network topology. Specifically, the techniques described herein enhance the site design process by providing guidance in the form of network topology best practices and allowing site designers to add a layer of behavior to guide the design of a site in the form of topology logic. These techniques may provide default topology layouts, while also allowing site designers to define the guidance for placement of devices when designing a site.

There are common topologies that are widely used across organizations: single switch, hub-and-spoke, classic three-tier, web-tier standard de-militarized zone (DMZ), ring, internal firewall, and others. These common topologies often exhibit the same layouts and rules. For example, a switch is often a LAN device in a WAN-LAN topology, but it does not make sense to have a switch device in the WAN area of one's network. Based on these best practices, the service provider may define one or more rules in a topology in order to provide that guidance. Because the techniques described herein provide the capability to define what areas of a topology can accept certain devices, there is the opportunity to provide a library of common topology layouts and rules based on such best practices.

The techniques described herein may also provide the capability for site designers to create and customize their own topology layouts and rules. During the design of a site, multiple network administration roles may be involved, and these individuals may have different levels of expertise. Further, organizations may have specific requirements, e.g. specific devices in their inventory or compliance requirements. In the multi-tenancy model, a managed service provider (MSP) may design a site template based on an organization's specific requirements, then publish the site template for a tenant admin who may tailor the site template as they see fit. The tenant admin may value having guidance in the form of topology logic and rules in order to guide the him or her in diagramming firewalls, switches, third-party devices, as well as WAN and LAN connectivity. Also, the techniques described herein provide validation for these user-defined rules to determine if a topology has been diagrammed correctly.

In accordance with the techniques described herein, computing device 32, belonging to a service provider, defines one or more rules for each of one or more network objects defining a valid placement within a network topology for the respective network object. These rules may also define how different devices in the network can connect with one another. Computing device 32 then creates a network topology template including at least one of the one or more network objects and publishes the network topology template to a server for reference by a network development application. The network development application may be a cloud application accessible by any of the one or more clients of the service provider, meaning that any of the clients may access the various templates and objects when constructing their own network topology within the application. Computing device 32 for the service provider may not be a part of SD-WAN system 2, but may instead be a remote device that updates server device 34, which stores the network development application, server device 34 and the network development application available to computing device 36 over an internet connection.

In further accordance with the techniques described herein, on the client side, computing device 36 accesses the network development application via server device 34, or via executing the application on computing device 36 itself. Computing device 36 receives an indication of user input assigning a first network device to a first area network in a network topology. Both the first network device and the first area network may be subject to one or more rules, including rules defined by computing device 32 and rules defined by the user of computing device 36. As such, subscriber device may use one or more characteristics of the first network device to validate that the particular placement of the first network device does not violate one or more rules for the first area network. If computing device 36 determines that the placement of the first network device violates these rules, computing device 36 may generate an invalidity indication of the rule particular rule violated. Conversely, responsive to validating the first network device, computing device 36 generates, by the computing device, a graphical user interface that includes at least a graphical indication of the first network device, a graphical indication of the first area network, a graphical indication of a second network device in the network topology, and a graphical indication of a connection between the first network device and the second network device. Computing device 36 then outputs, for display on a display device, the graphical user interface. Computing device 36 may also communicate with NFV orchestrator 13 for the step of configuring network devices in accordance with the final topology layout.

The techniques described herein may simplify building and visualizing a network topology. These techniques add a layer of behavior to guide the design of a network or site rather than provide a freeform canvas where users may make mistakes diagramming their network. By providing the drawing functionality, the techniques described herein enable end users to define the boundaries of a topology. Additionally, the techniques described herein define topology logic, and accepts user defined topology logic, in order to define validation for device placement. These techniques provide a computing device with a library of reusable topology layouts and rules, and the defined behavior logic can be integrated with device discovery features in order to automatically place discovered devices. By providing the freedom to build custom network layouts while also providing guidance and a set of rules to ensure valid design, the techniques described herein provide a valuable balance to automated tools and generic drawing tools, providing more freedom than automated tools while reducing user errors prevalent in the generic drawing tools. As such, these techniques may require less user input than generic drawing tools, as errors are pointed out rather than accepted, reducing the overall processing power. Further, these techniques may provide greater flexibility than automated tools, enabling these techniques to fit the needs of more users and their various network requirements.

In the example of FIG. 1, SD-WAN system 2 comprises access network 6 that provides connectivity to public network 12 via service provider software-defined wide area network 7 (hereinafter, "SD-WAN 7") and router 8. SD-WAN 7 and public network 12 provide packet-based services that are available for request and use by subscriber devices 16. As examples, SD-WAN 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

In general, subscriber devices 16 connect to gateway router 8 via access network 6 to receive connectivity to subscriber services for applications hosted by public network 12 or router 9. A subscriber may represent, for instance, an enterprise, a residential subscriber, or a mobile subscriber. Subscriber devices 16 may be, for example, personal computers, laptop computers or other types of computing devices positioned behind customer equipment (CE) 11, which may provide local routing and switching functions. Each of subscriber devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IoT) devices, such as cameras, sensors (S), televisions, appliances, etc. In addition, subscriber devices 16 may comprise mobile devices that access the data services of SD-WAN system 2 via a radio access network (RAN) 6. Example mobile subscriber devices include mobile telephones, laptop or desktop computers having, e.g., a 3G wireless card, wireless-capable netbooks, video game devices, pagers, smart phones, personal data assistants (PDAs) or the like.

A network service provider operates, or in some cases leases, elements of access network 6 to provide packet transport between subscriber devices 16 and router 8. Access network 6 represents a network that aggregates data traffic from one or more of subscriber devices 16 for transport to/from SD-WAN 7 of the service provider. Access network 6 includes network nodes that execute communication protocols to transport control and user data to facilitate communication between subscriber devices 16 and router 8. Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN) (not shown). Examples include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

SD-WAN appliance 18 may be a customer edge (CE) router, a provider edge (PE) router, or other network device between access network 6 and SD-WAN 7. SD-WAN 7 offers packet-based connectivity to subscriber devices 16 attached to access network 6 for accessing public network 12 (e.g., the Internet). SD-WAN 7 may represent a public network that is owned and operated by a service provider to interconnect a plurality of networks, which may include access network 6. In some examples, SD-WAN 7 may implement Multi-Protocol Label Switching (MPLS) forwarding and in such instances may be referred to as an MPLS network or MPLS backbone. In some instances, SD-WAN 7 represents a plurality of interconnected autonomous systems, such as the Internet, that offers services from one or more service providers. Public network 12 may represent the Internet. Public network 12 may represent an edge network coupled to SD-WAN 7 via a transit network 22 and one or more network devices, e.g., a customer edge device such as customer edge switch or router. Public network 12 may include a data center. Router 8 may exchange packets with service nodes 10 via virtual network 20, and router 8 may forward packets to public network 12 via transit network 22.

In examples of network 2 that include a wireline/broadband access network, router 8 may represent a Broadband Network Gateway (BNG), Broadband Remote Access Server (BRAS), MPLS PE router, core router or gateway, or Cable Modem Termination System (CMTS). In examples of network 2 that include a cellular access network as access network 6, router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 8 may be implemented in a switch, service card or another network element or component. In some examples, router 8 may itself be a service node.

A network service provider that administers at least parts of network 2 typically offers services to subscribers associated with devices, e.g., subscriber devices 16, that access SD-WAN system 2. Services offered may include, for example, traditional Internet access, VoIP, video and multimedia services, and security services. As described above with respect to SD-WAN 7, SD-WAN 7 may support multiple types of access network infrastructures that connect to service provider network access gateways to provide access to the offered services. In some instances, the network system may include subscriber devices 16 that attach to multiple different access networks 6 having varying architectures.

In general, any one or more of subscriber devices 16 may request authorization and data services by sending a session request to a gateway device such as SD-WAN appliance 18 or router 8. In turn, software-defined wide area network ("SD-WAN") appliance 18 may access a central server (not shown) such as an Authentication, Authorization and Accounting (AAA) server to authenticate the one of subscriber devices 16 requesting network access. Once authenticated, any of subscriber devices 16 may send subscriber data traffic toward SD-WAN 7 to access and receive services provided by public network 12, and such packets may traverse router 8 as part of at least one packet flow. In some examples, SD-WAN appliance 18 may forward all authenticated subscriber traffic to public network 12, and router 8 may apply services 15 and/or steer particular subscriber traffic to a data center 9 if the subscriber traffic requires services on service nodes 10. Applications (e.g., service applications) to be applied to the subscriber traffic may be hosted on service nodes 10.

For example, when forwarding subscriber traffic, router 8 may direct individual subscriber packet flows through services 15 executing on one or more service cards installed within router 9. In addition, or alternatively, SD-WAN system 2 includes a data center 9 having a cluster of service nodes 10 that provide an execution environment for the mostly virtualized network services. In some examples, each of service nodes 10 represents a service instance. Each of service nodes 10 may apply one or more services to traffic flows. As such, router 8 may steer subscriber packet flows through defined sets of services provided by service nodes 10. That is, in some examples, each subscriber packet flow may be forwarded through a particular ordered combination of services provided by service nodes 10, each ordered set being referred to herein as a "service chain." As examples, services 15 and/or service nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

In the example of FIG. 1, subscriber packet flows may be directed along a service chain that includes any of services 15 and/or services applied by service nodes 10. Once processed at a terminal node of the service chain, i.e., the last service to be applied to packets flowing along a particular service path, the traffic may be directed to public network 12.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. For example, a given subscriber may be associated with a particular service profile, which in turn is mapped to a service tunnel associated with a particular service chain. Similarly, another subscriber may be associated with a different service profile, which in turn is mapped to a service tunnel associated with a different service chain. In some examples, after SD-WAN appliance 18 has authenticated and established access sessions for the subscribers, SD-WAN appliance 18 or router 8 may direct packet flows for the subscribers along the appropriate service tunnels, thereby causing data center 9 to apply the requisite ordered services for the given subscriber. In some examples, SDN controller 14 may also provide a forwarding rule set to SD-WAN appliance 18 or router 8 for managing the forwarding path. In some examples, SDN controller 14 manages the forwarding path through all elements in data center 9 starting at router 8.

In some examples, service nodes 10 may implement service chains using internally configured forwarding state that directs packets of the packet flow along the service chains for processing according to the identified set of service nodes 10. Such forwarding state may specify tunnel interfaces for tunneling between service nodes 10 using network tunnels such as IP or Generic Route Encapsulation (GRE) tunnels, Network Virtualization using GRE (NVGRE), or by using VLANs, Virtual Extensible LANs (VXLANs), MPLS techniques, and so forth. In some instances, real or virtual switches, routers or other network elements that interconnect service nodes 10 may be configured to direct the packet flow to the service nodes 10 according to service chains.

In the example of FIG. 1, SD-WAN system 2 comprises a software defined network (SDN) and network functions virtualization (NFV) architecture. SDN controller device 14 may provide a high-level controller for configuring and managing the routing and switching infrastructure of SD-WAN system 2. While some instances described herein relate to SD-WAN appliance 18 performing the edge-based routing techniques described herein, SDN controller 14 may also perform these techniques for SD-WAN system 2. NFV orchestrator device 13 may provide a high-level orchestrator for configuring and managing virtualization of network services into service nodes 10 of data center 9. In some instances, SDN controller 14 manages deployment of virtual machines (VMs) within the operating environment of data center 9. For example, SDN controller 14 may interact with provider edge (PE) router 8 to specify service chain information. For example, the service chain information provided by SDN controller 14 may specify any combination and ordering of services provided by service nodes 10, traffic engineering information for tunneling or otherwise transporting packet flows along service paths, rate limits, Type of Service (TOS) markings or packet classifiers that specify criteria for matching packet flows to a particular service chain. Further example details of an SDN controller are described in PCT International Patent Application PCT/US13/44378, filed Jun. 5, 2013, the entire content of which is incorporated herein by reference.

Although illustrated as part of data center 9, service nodes 10 may be network devices coupled by one or more switches or virtual switches of SD-WAN 7. In one example, each of service nodes 10 may run as VMs in a virtual compute environment. Moreover, the compute environment may comprise a scalable cluster of general computing devices, such as x86 processor-based servers. As another example, service nodes 10 may comprise a combination of general purpose computing devices and special purpose appliances. As virtualized network services, individual network services provided by service nodes 10 can scale just as in a modern data center through the allocation of virtualized memory, processor utilization, storage and network policies, as well as horizontally by adding additional load-balanced VMs. In other examples, service nodes 10 may be gateway devices or other routers. In further examples, the functionality described with respect to each of service nodes 10 may be implemented in a switch, service card, or another network element or component.

Figure 2:
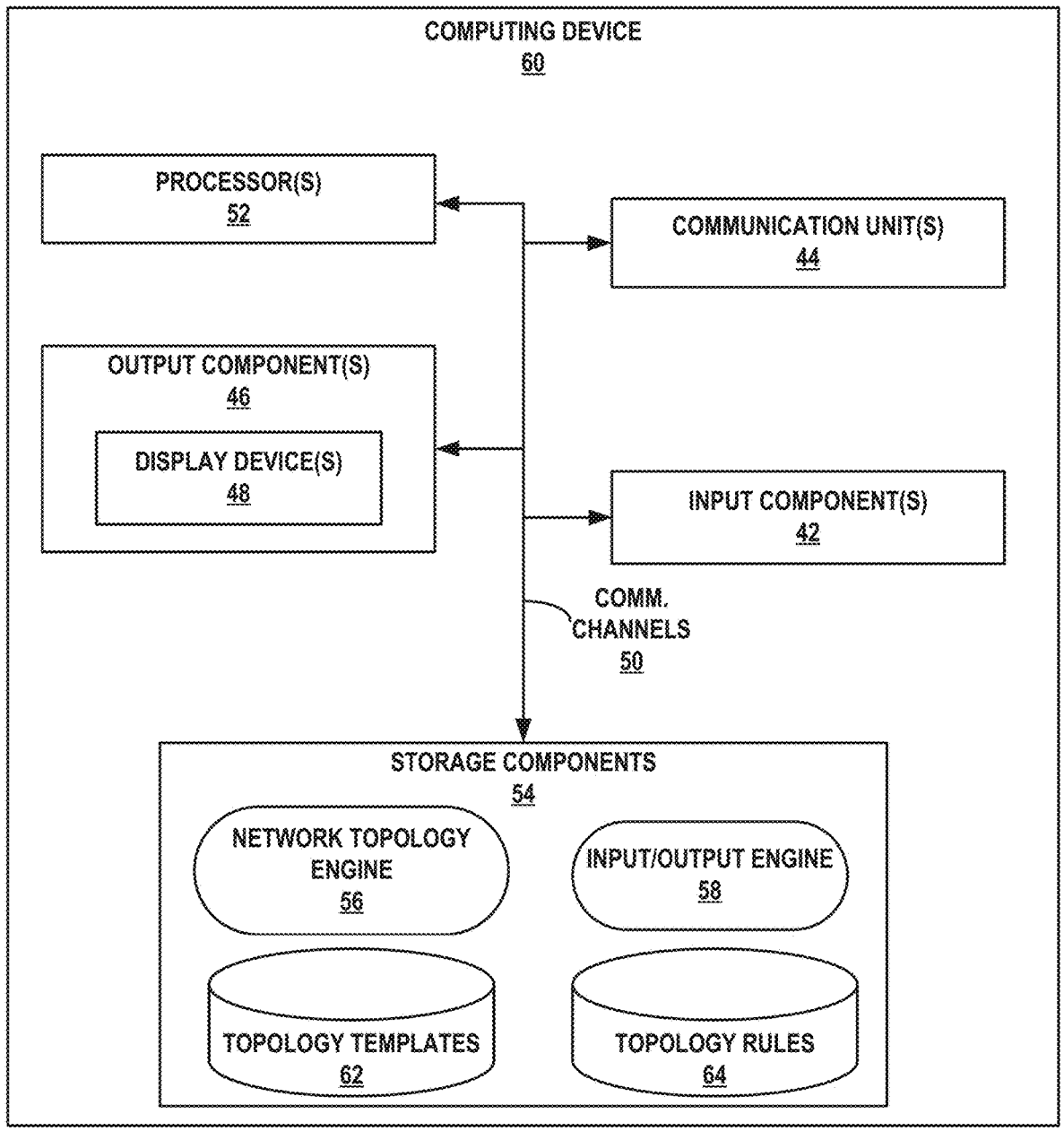
FIG. 2 is a block diagram illustrating an example computing device configured to perform the network topology generation techniques of this disclosure.

FIG. 2 is a block diagram illustrating an example computing device 60 configured to perform the network topology generation techniques of this disclosure. Computing device 60 of FIG. 2 is described below as one particular example of any of subscriber devices 16 shown in FIG. 1. FIG. 2 illustrates only one particular example of subscriber devices 16, and many other examples of subscriber devices 16 may be used in other instances and may include a subset of the components included in example computing device 60 or may include additional components not shown in FIG. 2.

For example, computing device 60 may include a battery to provide power to the components of computing device 60. Similarly, the components of computing device 60 shown in FIG. 2 may not be necessary in every example of computing device 60. For example, in some configurations, computing device 60 may not include communication units 44.

As shown in the example of FIG. 2, computing device 60 includes one or more processors 52, one or more input components 42, one or more communication units 44, one or more output components 46, and one or more storage components 54. Output components 46 may include one or more display devices 48. In some instances, computing device 60 may be an enterprise or end user device. In other instances, computing device 60 may be a device for a service provider configuring aspects of the network topology application.

Output components 46, in some examples, are configured to provide output to a user using tactile, audio, or video stimuli, such as via display device 48. Output components 46, in one example, include an electronic display, a loudspeaker, or any other type of device for converting a signal into an appropriate form understandable to humans or machines. The electronic display may be a liquid crystal display (LCD) or organic light-emitting diode (OLED) part of a touch screen, may be a non-touchscreen direct view display component such as a cathode ray tube (CRT), light-emitting diode (LED), LCD, or OLED. The display component may also be a projector instead of a direct view display.

Input components 42, in some examples, is configured to receive input from a user through tactile, audio, or video feedback. Examples of input components 42 include a display component, a mouse, a keyboard, a camera, a microphone or any other type of device for detecting input from a user. In some examples, a display component includes a touch-sensitive screen. Input component 30 may, for instance, include camera 6. In some instances, camera 6 may be configured to record an image or a video stream. In some further instances, camera 6 may also include a microphone to capture audio data.

One or more storage components 54 of computing device 60 include network topology engine 56, input/output (I/O) engine 58, topology templates 62, and topology rules 64. One or more storage components 54 may be configured to store information within computing device 60 during operation. Storage components 54, in some examples, is described as a computer-readable storage medium. In some examples, storage components 54, topology templates 62 and topology rules 64 is stored in a temporary memory, meaning that a primary purpose of storage components 54, topology templates 62, and topology rules 64 is not long-term storage. Storage components 54, topology templates 62, and topology rules 64, in some examples, are described as volatile memories, meaning that storage components 54, topology templates 62, and topology rules 64 do not maintain stored contents when the computing device is turned off. Examples of volatile memories include random access memories (RAM), dynamic random access memories (DRAM), static random access memories (SRAM), and other forms of volatile memories known in the art. In some examples, storage components 54 is used to store program instructions for execution by processors 52.

Storage components 54, topology templates 62, and topology rules 64, in some examples, also include one or more computer-readable storage media. Storage components 54, topology templates 62, and topology rules 64 may be configured to store larger amounts of information than volatile memory. Storage components 54, topology templates 62, and topology rules 64 may further be configured for long-term storage of information. In some examples, storage components 54, topology templates 62, and topology rules 64 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Communication channels 50 may interconnect each of the components 42, 44, 46, 48, 52, 54, 56, 58, 62, and 64 for inter-component communications (physically, communicatively, and/or operatively). In some examples, communication channels 50 may include a system bus, a network connection, an inter-process communication data structure, or any other method for communicating data.

One or more communication units 44 of computing device 60 may communicate with external devices, such as a server device, via one or more wired and/or wireless networks by transmitting and/or receiving network signals on the one or more networks. Communication units 44 may include a network interface card, such as an Ethernet card, an optical transceiver, a radio frequency transceiver, or any other type of device that can send and receive information. Examples of such network interfaces may include Bluetooth, infrared signaling, 3G, LTE, and Wi-Fi radios as well as Universal Serial Bus (USB) and Ethernet. In some examples, computing device 60 utilizes communication units 44 to wirelessly communicate with another computing device that is operably coupled to computing device 60. For instance, when computing device 60 is an end user device, computing device 60 may utilize communication units 44 to communicate with a network server that stores topology data for us in constructing network topologies using the techniques described herein.

One or more processors 52, in one example, are configured to implement functionality and/or process instructions for execution within computing device 60, such as those associated with modules 56 and 58. For example, processors 52 may be capable of processing instructions stored in storage components 54. Examples of processors 52 may include, any one or more of a microprocessor, a controller, a digital signal processor (DSP), an application specific integrated circuit (ASIC), a field-programmable gate array (FPGA), or equivalent discrete or integrated logic circuitry.

In accordance with the techniques described herein, in some instances, computing device 60 may be a computing device used by a service provider administrator. Service provider administrators can define validation rules for device placement, and create and publish reusable network topology layouts and rules associated with the topology layouts that are reusable by clients constructing their own networks. In such instances, I/O engine 58 may receive user input from service administrators at input component 42 that network topology engine 56 may use to define one or more rules, stored at least locally in topology rules 64, for each of one or more network objects. These rules may define at least valid placement within a network topology for the respective network object. For instance, service gateways may only be effective when placed in particular types of area networks, and so a rule may be defined permitting network devices having metadata defining the device type as "service gateway" to be placed only in the permissible types of area networks. As another example, aggregation networks may be valid when placed in a LAN, but may not operate correctly when placed inside other area networks. A rule may be defined permitting placement of aggregation networks when placed in a location having a particular relation to with other networks.

In other instances, when network topology engine 56 defines rules based on the received user input, network topology engine 56 may craft the rules to define connection options between a first network object of the one or more network objects and a second network object of the one or more network objects. For instance, two network devices may have various characteristics that lead them to be best suited for being connected over an Internet link rather than a Multi-Protocol Label Switching (MPLS) connection (e.g., a label-switched path) or an LTE link. Meanwhile, two other network devices may be configured to communicate over a link of a particular type due to hardware designed to communicate over the particular type of link, such as an Ethernet connection. Network topology engine 56 may be configured to create a set of rules from the user input received at input component 32 (e.g., storing the inputted rules on the device or on a server device), the rules defining which type of link should be used in any particular situation based on information about the network devices being connected, including the location of the network device upon being placed in the network topology.

Network topology engine 56 creates a network topology template, to be stored at least locally in topology templates 62, that includes at least one of the one or more network objects, such as an area network or a network device. I/O engine 58 publishes the network topology template to a server for reference by a network development application. This template-creation process may be repeated multiple times, with each iteration of the process creating a different template with a set of corresponding rules, providing the client with multiple potential templates to be used in the network designing process. The network development application may be a cloud application, accessible to computing devices of end users who subscribe to the service provider, where various templates and objects may be retrieved and placed in a network topology. In some instances, topology templates 62 and topology rules 64 may be stored locally on computing device 60, and computing device 60 may send topology templates 62 and topology rules 64 to the client when the client is accessing the network development application. The client (e.g., an enterprise administrator) may use topology templates 62 and topology rules 64 when designing their networks. In other instances, in addition to or instead of storing this data locally, topology templates 62 and topology rules 64 may be stored on the server along with the network development application.

In further accordance with the techniques described herein, in some instances, computing device 60 may be a computing device belonging to an enterprise or end user. In such instances, I/O engine 58 receives an indication of user input at input component 42 assigning a first network device to a first area network in a network topology. For example, the first area network may be any of a local area network, a wide area network, a software-defined wide area network, a perimeter network, a trusted network, an untrusted network, a core network, an aggregation network, an access network, an edge network, or other network type. The one or more characteristics of the first network device may include one or more of a device role, a device series, or a device type, and wherein the one or more characteristics are defined by metadata associated with the first network device. Prior to receiving this first user input, I/O engine 58 may receive an indication of a second user input adding the first area network itself to the network topology, either through a selection of just the first area network or through a selection of a template of topology templates 62 that includes the first area network.

In response to receiving an indication of the placement of the first network device in the first area network from I/O engine 58, network topology engine 56 validates that the first network device does not violate one or more topology rules 64 for the first area network based on characteristics of the first network device, such as location within the network topology, the type of the first network device (e.g., based on device metadata), and the role of the first network device.

Network topology engine 56 may itself determine, based on one or more characteristics of the first area network, the one or more rules for the first area network. For instance, network topology engine 56 may determine which type of network makes up the first area network. Network topology engine 56 may then access topology rules 64, stored either locally or on a remote server, and retrieve the particular rules defined for that type of area network.

These topology rules 64 may be initially defined as part of a template, which may be defined as described above by a user such as a user associated with a service provider, and may, in some instances, be supplemented by additional user-defined rules. For example, I/O engine 58 may receive an indication of an additional user input, first enabling a mode in which user-defined rules may be received, and then defining a first user-defined rule for the first area network. These user-defined rules may not violate or contradict the rules defined by the template, but may provide additional restraints on the location and settings of various devices to provide additional customization that fits the particular needs of the particular client using computing device 60. I/O engine 58 sets the one or more rules for the first area network to include the first user-defined rule, either by saving the first user-defined rule locally to topology rules 64 or saving the first user-defined rule on a remote server hosting the network development application.

Responsive to network topology engine 56 validating the first network device, I/O engine 58 generates a graphical user interface (GUI). The GUI includes at least a graphical indication of the first network device and a graphical indication of the first area network. In instances where the first network device is not the only device present in the network topology, the GUI also includes a graphical indication of a second network device in the network topology and may automatically select and output a graphical indication of a connection between the first network device and the second network device. I/O engine 58 outputs, for display on display device 48, the graphical user interface.

For the connection, in response to network topology engine 56 determining that the first network device and the second network device are placed in the overall network topology, network topology engine 56 may automatically analyze the two network devices to determine whether a connection is suitable and, if so, what type of connection is possible and should be recommended. For example, network topology engine 56 may reference topology rules 64 to determine one or more characteristics of the first network device, one or more characteristics of the second network device, and the potential connection types each network device is capable of utilizing. Network topology engine 56 may then determine, based on the one or more characteristics of the first network device and the one or more characteristics of the second network device, that the first network device and the second network device are connectable network devices. Network topology engine 56 may further determine what type of connection is possible and should be selected for placement between the first network device and the second network device once network topology engine 56 determines that the two network devices are indeed connectable. I/O engine 58 may automatically select and place the graphical indication of the connection in the graphical user interface responsive to detecting a presence of both the first network device and the second network device within the network topology. In some instances, the graphical indication of the connection between the first network device and the second network device is further indicative of the type of the connection between the first network device and the second network device (e.g., Internet link, MPLS link (e.g., LSP), LTE link, etc.). If the placed connection is not desired, I/O engine 58 may receive additional user input at input component 52 rejecting the placement of the connection between the two network devices. This rejection could result in network topology engine 56 removing the connection between the two network devices, or replacing the connection with a connection of a different type if both network devices are able to be linked using multiple different connection types.

In other instances, network topology engine 56 may utilize user input to define the type of connection between two network devices. As such, I/O engine 58 may receive an indication of an additional user input defining the connection between the first network device and the second network device. The second network device may either also be assigned to the first area network, or may instead be assigned to a second, different area network within the network topology, the first and second area networks having different types (e.g., a LAN and an SD-WAN).

Conversely, network topology engine 56 may determine that the placement of the first network device in the first area network violates topology rules 64. In such instances, responsive to network topology engine 56 determining that the first network device violates topology rules 64 for the first area network, network topology engine 56 may cause I/O engine 58 to output, for display on display device 48, an invalidity indication of a rule of the one or more rules violated by the third network device being assigned to the first area network. For instance, if the first area network requires a role of the first network device to be an access device, but the role of the first network device is instead an aggregation device, network topology engine 56 may cause I/O engine 58 to output an invalidity indication that the first network device violates the role requirement for the first area network.

Once the user is finished creating the desired network topology, the user may continue the end-to-end process provided by the techniques of this disclosure. For instance, network topology engine 56 may cause I/O engine 58 to publish a diagram of the network topology to a server for physical implementation, the network topology including at least the first network device, the second network device, the first area network, and the connection. By publishing the diagram, some other internal entity of the enterprise may receive the specifications for how the network topology should be laid out, providing a blueprint for the physical implementation of the network topology and deployment of the network devices. If network topology engine 56 has information indicating the devices currently in the network, network topology engine 56 may compare the current equipment currently owned by the customer with the equipment needed for the full physical implementation of the network topology and generate a bill of materials required for the physical implementation of the network topology, the bill of materials for procuring the remaining equipment needed for the full physical implementation of the network topology.

Network topology engine 56 may also create user-defined templates from the built topology. For instance, after the user is finished adding components to the network topology, network topology engine 56 may save the network topology as a template topology in topology templates 62 locally or on the server hosting the network development application. At a future time, when the user wishes to create a network topology, the user may select this custom template as a starting point for the new topology. For instance, network topology engine 56 may receive an indication of user input selecting the template topology as an initial layout for a second network topology.

While users may manually select objects for inclusion in the network topology, the techniques described herein also enable the user to initiate a scan for existing devices such that these existing devices could be included in the network topology. For instance, network topology engine 56 may perform an automatic network discovery operation to identify one or more existing network objects. For each of the one or more existing network objects, network topology engine 56 may determine, based on one or more rules associated with the respective available network object, a valid placement location for the respective available network object within the network topology, and place the respective available network object at the valid placement location within the network topology. I/O engine 58 may then generate an updated graphical user interface that includes at least a graphical indication of each of the one or more available network objects at the respective valid placement location within the network topology, and output, for display on display device 48, the updated graphical user interface. In some examples, scan may also be performed automatically without requiring I/O engine 58 to receive an indication of user input initiating the scan.

The techniques of this disclosure may provide one or more advantages. The techniques described herein may simplify the process of building and visualizing a network topology. These techniques add a layer of automatic behavior to guide the design of a network or site rather than provide a freeform canvas where users may make mistakes diagramming their network. By providing the drawing functionality, the techniques described herein enable end users to define the boundaries of a topology. Additionally, the techniques described herein define topology logic, and accepts user defined topology logic, in order to define validation for device placement. These techniques provide a computing device with a library of reusable topology layouts and rules, and the defined behavior logic can be integrated with device discovery features in order to automatically place discovered devices. By providing the freedom to build custom network layouts while also providing guidance and a set of rules to ensure valid design, the techniques described herein provide a valuable balance to automated tools and generic drawing tools, providing more freedom than automated tools while reducing user errors prevalent in the generic drawing tools. As such, these techniques may require less user input than generic drawing tools, as errors are pointed out rather than accepted, reducing the overall time and device processing power needed for network design. Further, these techniques may provide greater flexibility than automated tools, enabling these techniques to fit the needs of more users and their various network requirements.

Figure 3:
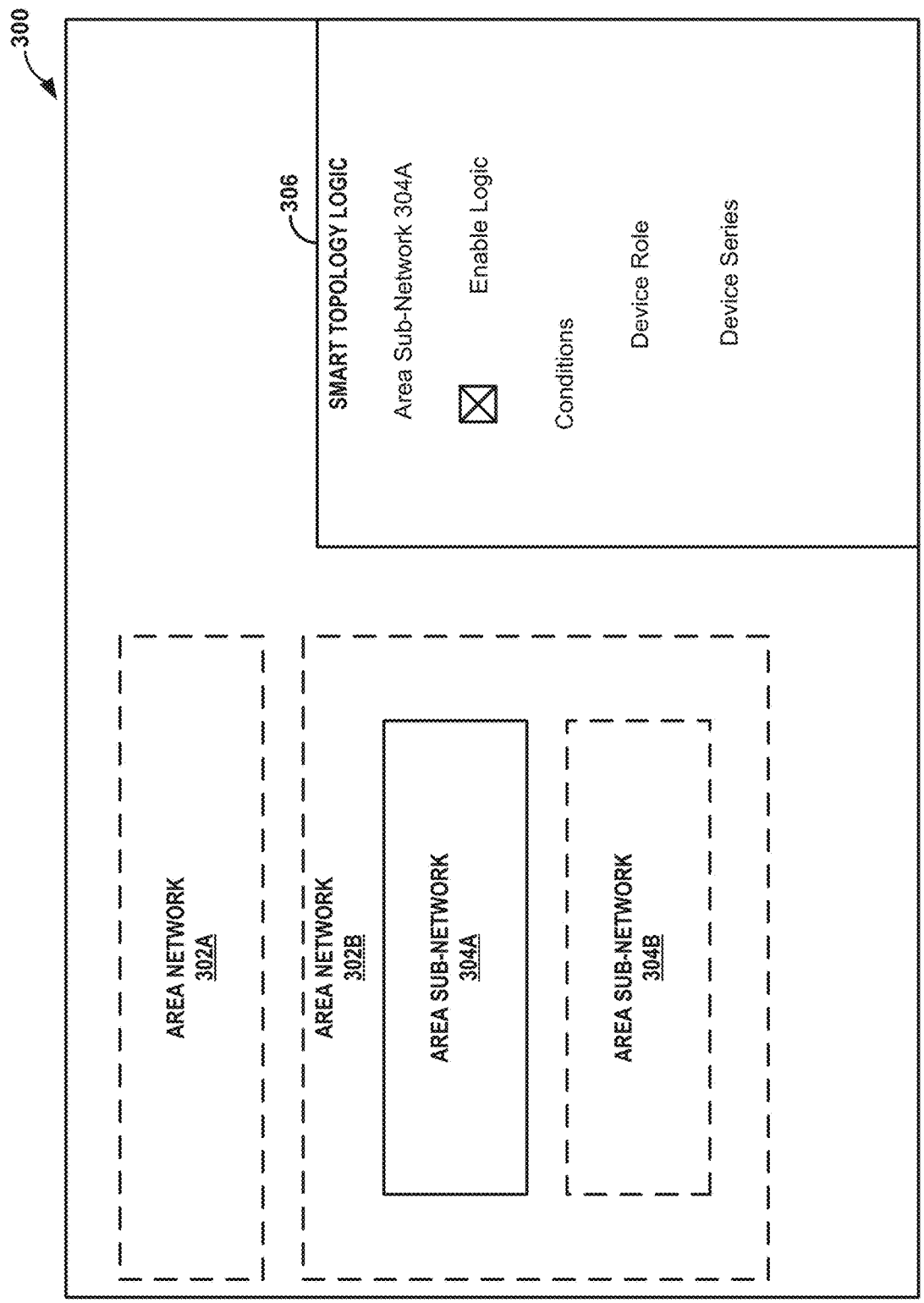
FIG. 3 is a conceptual diagram illustrating an example graphical user interface of an application configured to perform the network topology generation techniques of this disclosure

FIG. 3 is a conceptual diagram illustrating an example graphical user interface 300 of an application configured to perform the network topology generation techniques of this disclosure. GUI 300 may be output for display on a display device, such as display device 48 of FIG. 2. In the GUI of 300, area network 302A may be a graphical indication of a first area network, such as an SD-WAN. Area network 302B may be a graphical indication of a second area network, such as a LAN. In the example of FIG. 3, area network 302B further includes two sub-networks, area sub-networks 304A and 304B. Area sub-networks 304A-304B may be any area network that can be incorporated into a LAN, such as an aggregate network or an access network.

The boundaries of these networks may be representative of inclusion within such network, meaning that any device placed wholly in the boundaries of a single area network or area sub-network implies that the device would reside wholly in that area network or area sub-network. If a device were to span two different area networks or area sub-networks, it may be implied that this device is a border device between the two area networks or area sub-networks.

In the example of FIG. 3, area-sub-network 304A is selected, as indicated by the solid line around area sub-network 304A as opposed to the dashed lines around area networks 302A-302B and area sub-network 304B. Once selected, logic window 306 is included in GUI 300. Logic window 306 first includes a toggle to enable or disable user-defined logic conditions. If the user-defined logic conditions are disabled, then the application may only consider the rules defined by the service provider. In the instance of FIG. 3, the user-defined logic conditions are enabled, meaning that users may enter additional conditions into the overall topology logic. These rules may include defining device roles or device series that can or cannot exist in area sub-network 304A.

FIGS. 4A-4E are conceptual diagrams illustrating a series of graphical user interfaces 400A-400E showing a sequence of adding network devices to various area networks in a network topology, in accordance with the techniques of this disclosure. GUIs 400A-400E may be output for display on a display device, such as display device 48 of FIG. 2. In the GUIs of 400A-400E, area network 402A may be a graphical indication of a first area network, such as an SD-WAN. Area network 402B may be a graphical indication of a second area network, such as a LAN. In the example of FIG. 4, area network 402B further includes two sub-networks, area sub-networks 404A and 404B. Area sub-networks 404A-404B may be any area network that can be incorporated into a LAN, such as an aggregate network or an access network.

GUIs 400A-400E also includes device window 406, which includes graphical indications of various network devices that may be added to the network topology represented in GUIs 400A-400E. In the current example, these devices include services gateway 408 and virtual chassis 410.

Figure 4A:
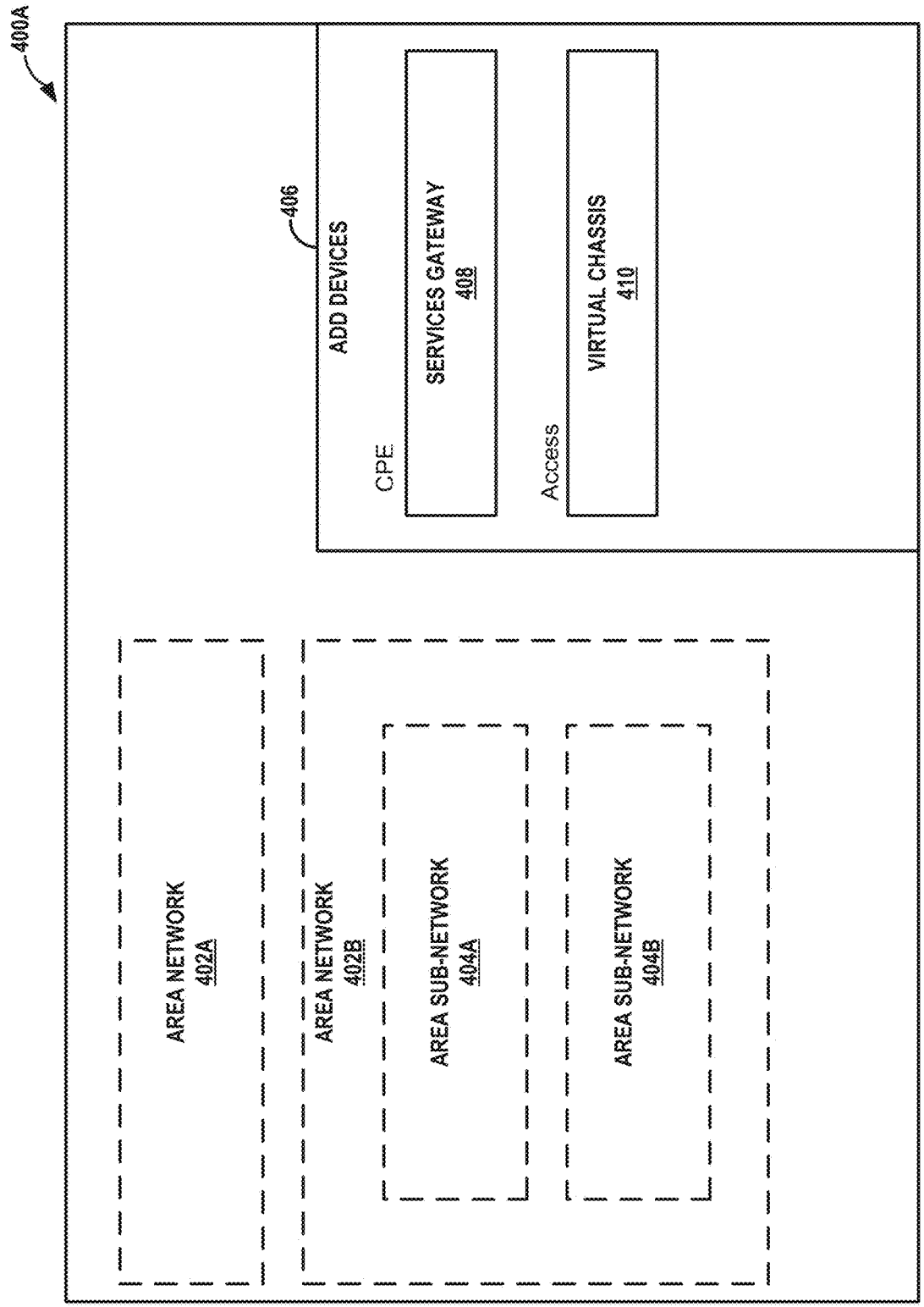
FIGS. 4A-4E are conceptual diagrams illustrating a series of graphical user interfaces showing a sequence of adding network devices to various area networks in a network topology, in accordance with the techniques of this disclosure.
Figure 4B:
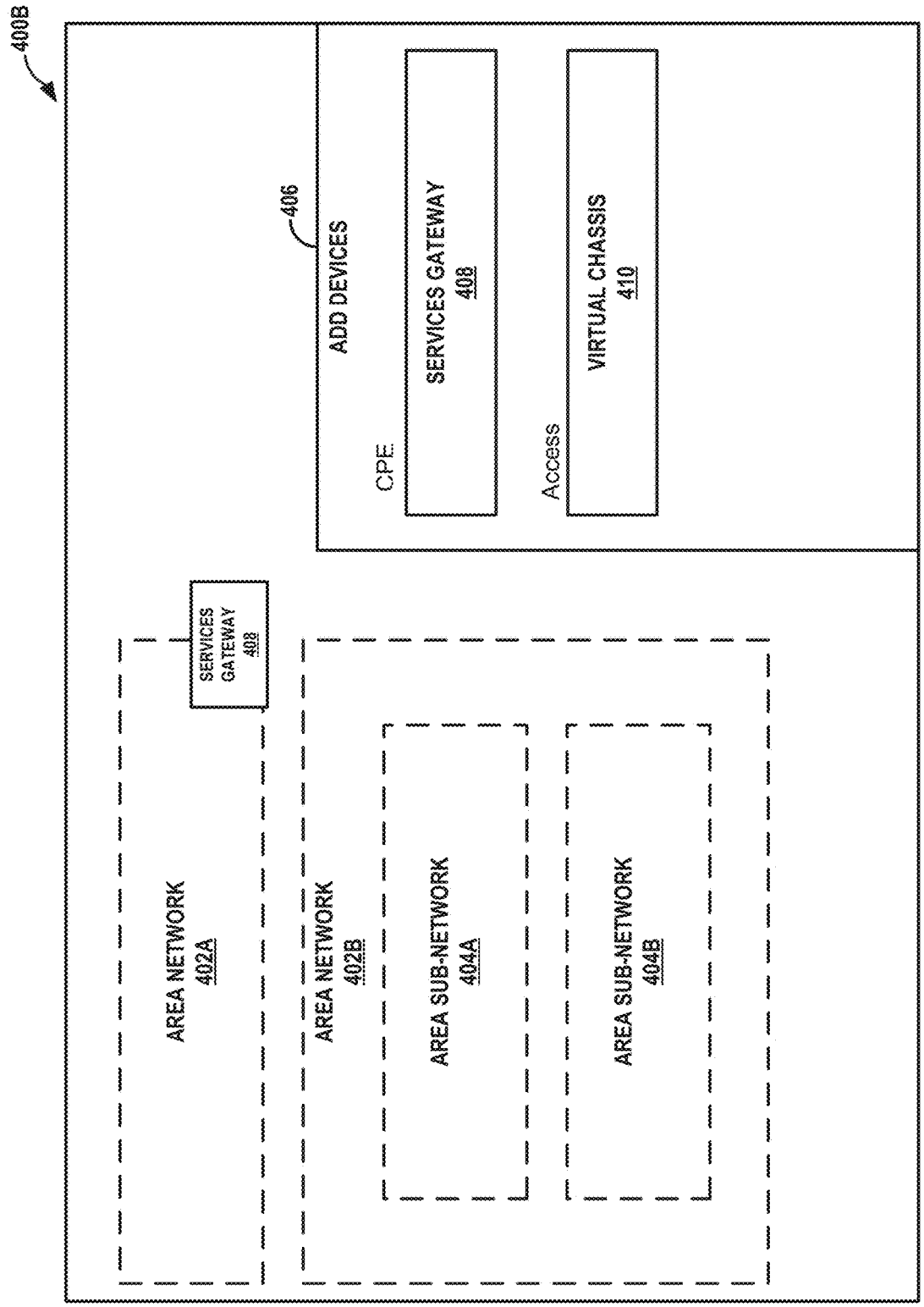

In GUI 400B of FIG. 4B, the computing device outputting GUI 400B has received an indication of user input selecting services gateway 408 from device window 406. In some instances, the sequence of adding a device to the network topology may include receiving a first selection of the device from device window 406 followed by a selection of an area network 402A-402B or area sub-network 404A-404B, or vice versa. In other instances, such as the example of FIG. 4B, the sequence of adding services gateway 408 to area network 402A may include receiving a selection of services gateway 408 and then a drag input from the location of services gateway 408 into the portion of GUI 400B depicting area network 402A.

Figure 4C:
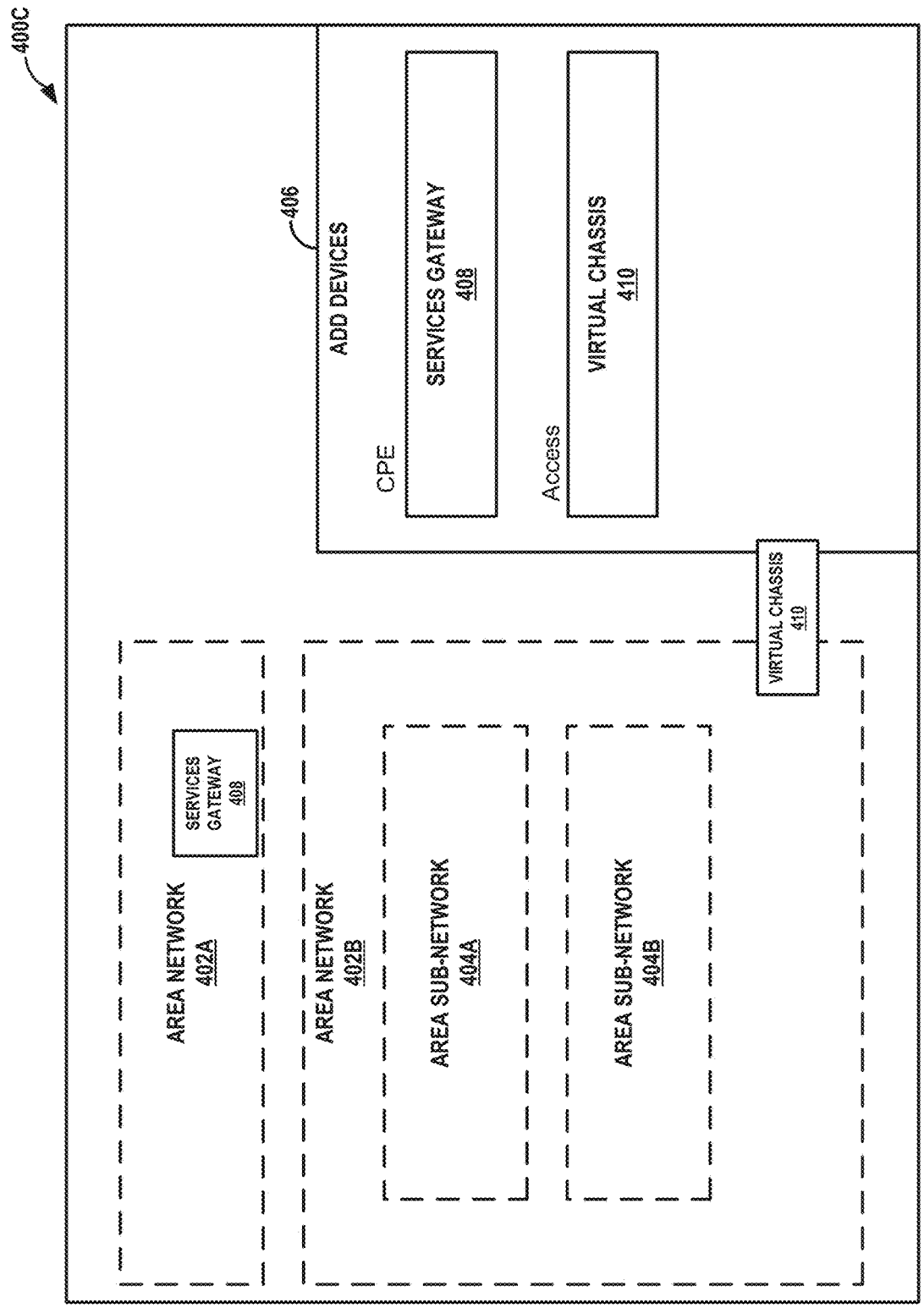

In GUI 400C of FIG. 4C, the computing device outputting GUI 400C has finalized the placement of services gateway 408 into area network 402A, validating that the placement of services gateway 408 into area network 402A does not violate any of the topology rules for either services gateway 408 and area network 402A. Additionally, the computing device outputting GUI 400C may also begin receiving the sequence of user inputs required to move virtual chassis 410 from device window 406 into the network topology.

Figure 4D:
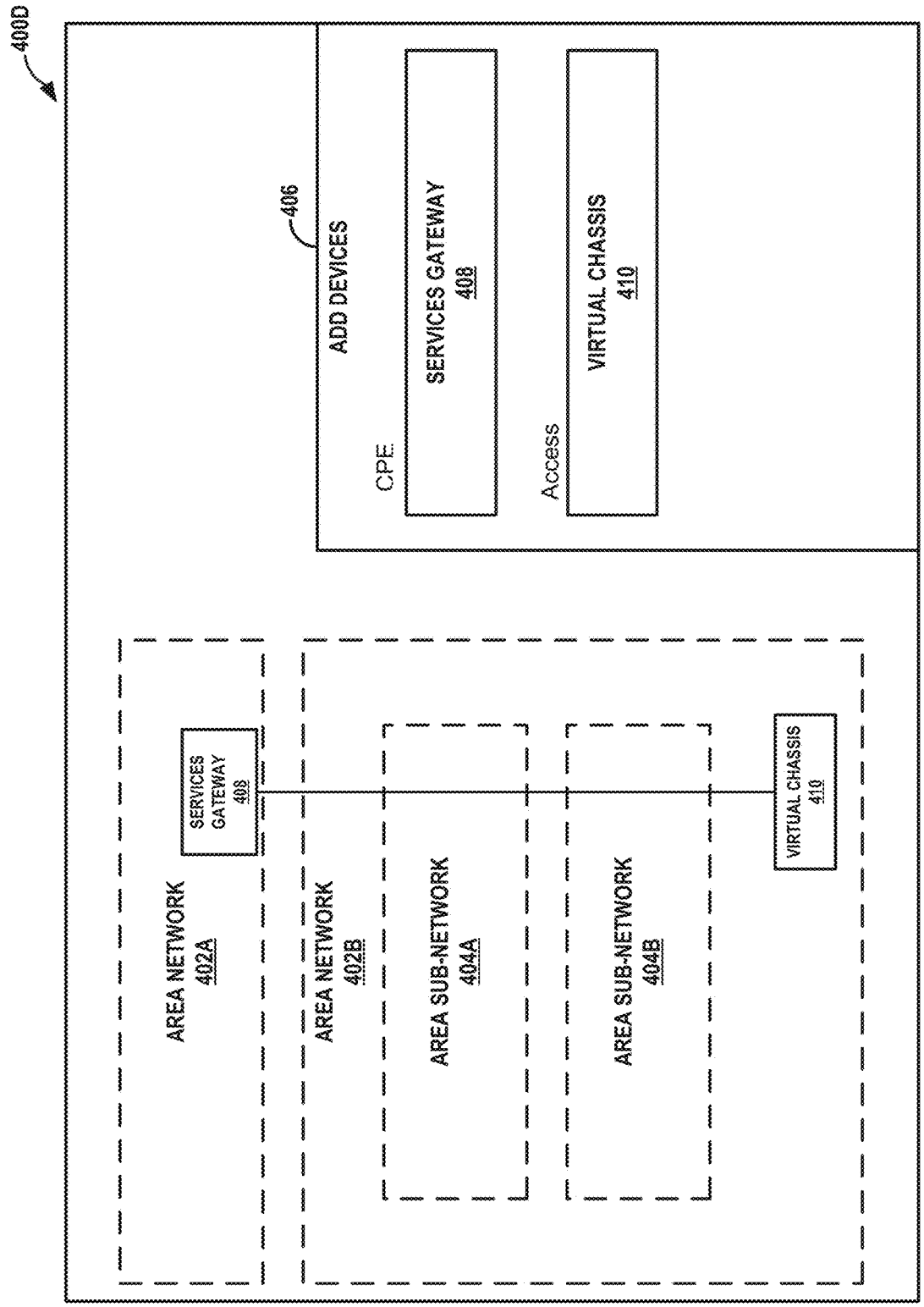

In GUI 400D of FIG. 4D, the computing device outputting GUI 400D has finalized the placement of virtual chassis 410 into area network 402B, validating that the placement of virtual chassis 410 into area network 402B does not violate any of the topology rules for either virtual chassis 410 and area network 402B. As virtual chassis 410 is the second network device added to the network topology, the computing device outputting GUI 400D may also generate a graphical indication of a connection between virtual chassis 410 and services gateway 408.

Figure 4E:
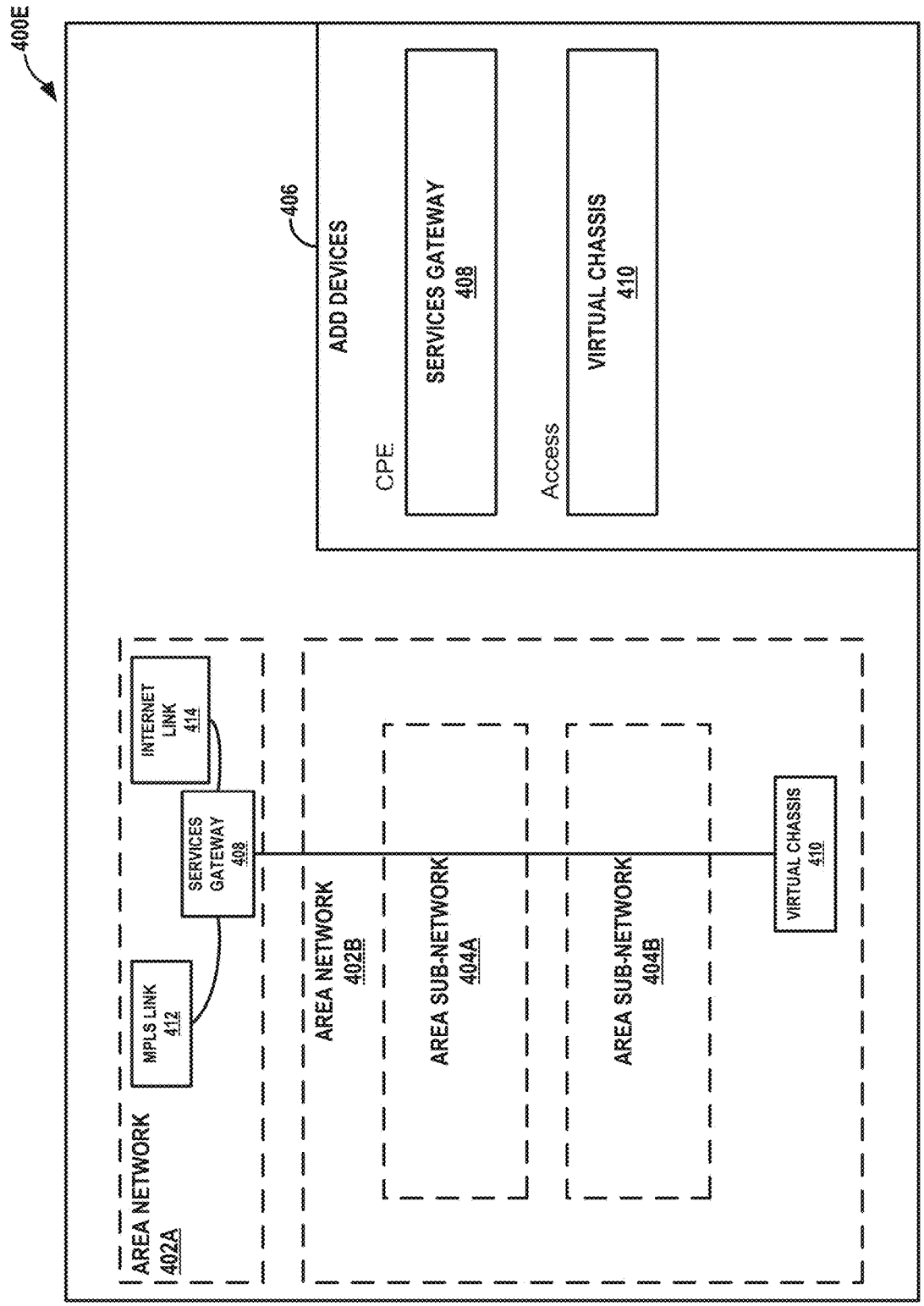

In GUI 400E of FIG. 4E, the computing device outputting GUI 400E may additionally output graphical indications identifying the type of links between services gateway 408 and virtual chassis 410. For instance, based on the characteristics of services gateway 408 and virtual chassis 410, such as the role of each device, the type of each device, and the respective locations of the devices, the computing device outputting GUI 400E may determine that services gateway 408 and virtual chassis 410 are connectable using both an MPLS link and an Internet link. As such, the computing device may output MPLS link indication 412 and Internet link indication 414 to GUI 400E, indicating the types of connections possible for services gateway 408 and virtual chassis 410.

Figure 5A:
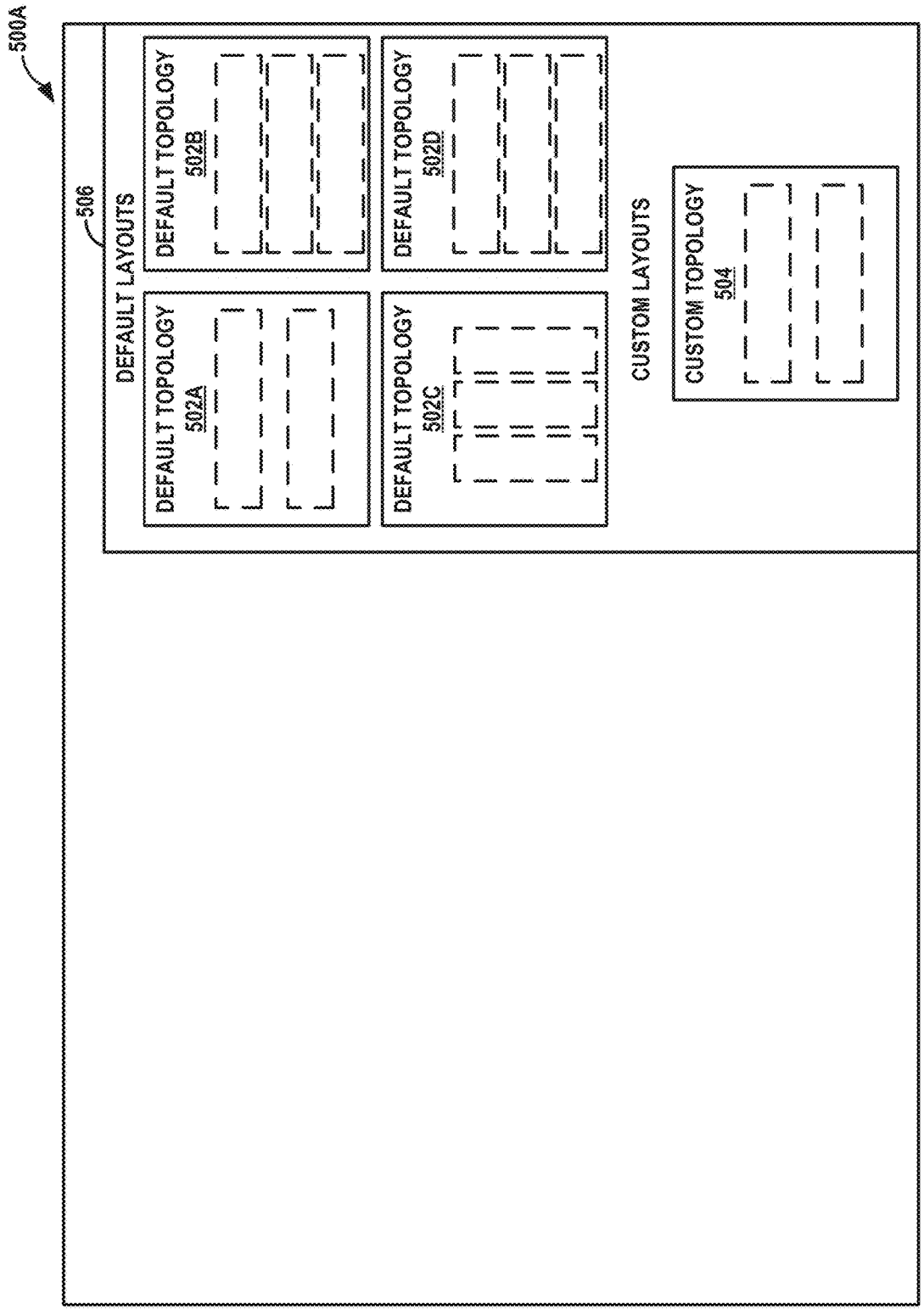
FIGS. 5A-5C are conceptual diagrams illustrating a series of graphical user interfaces showing a sequence of adding a template topology to a network topology, in accordance with the techniques of this disclosure.
Figure 5B:
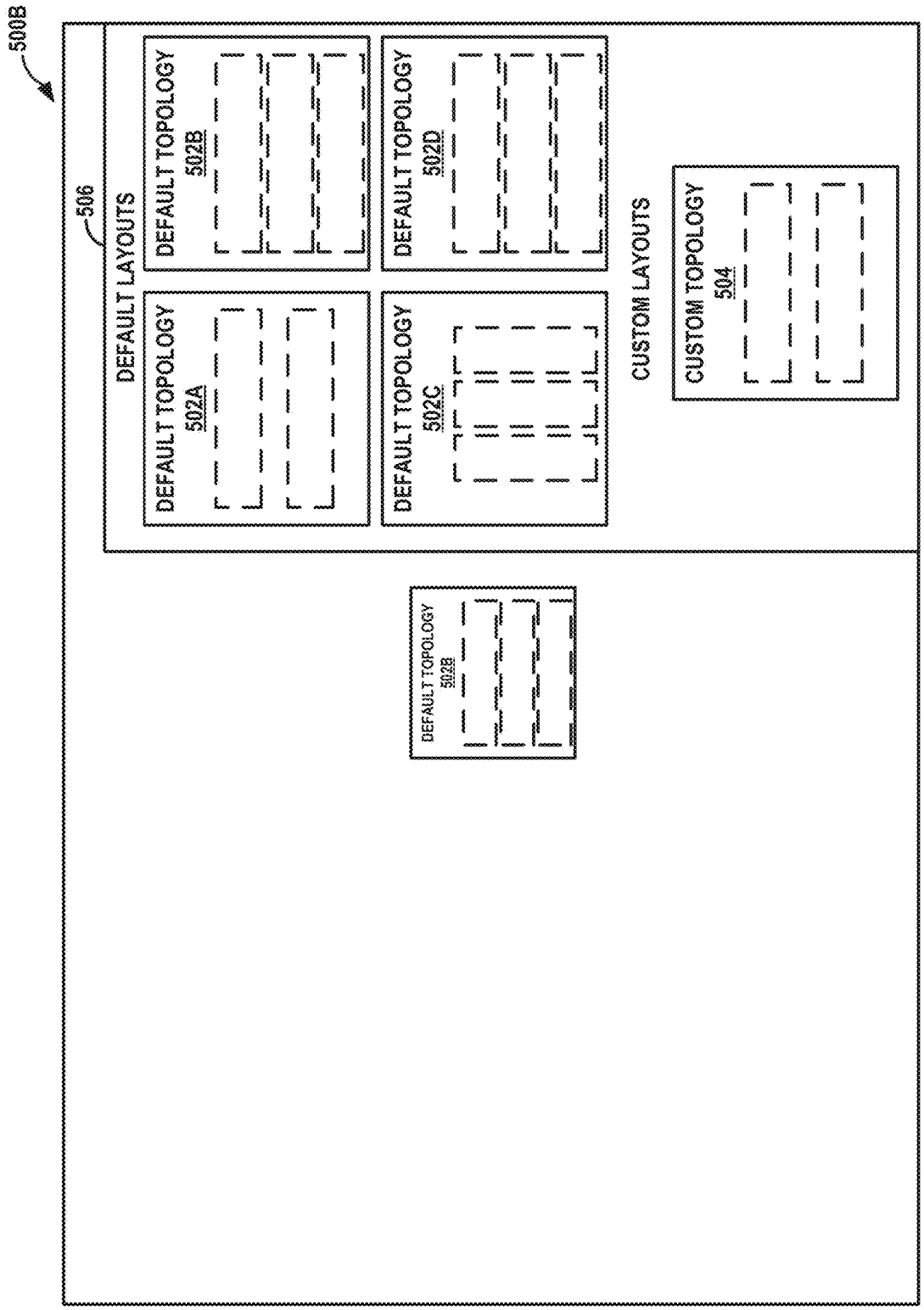
Figure 5C:
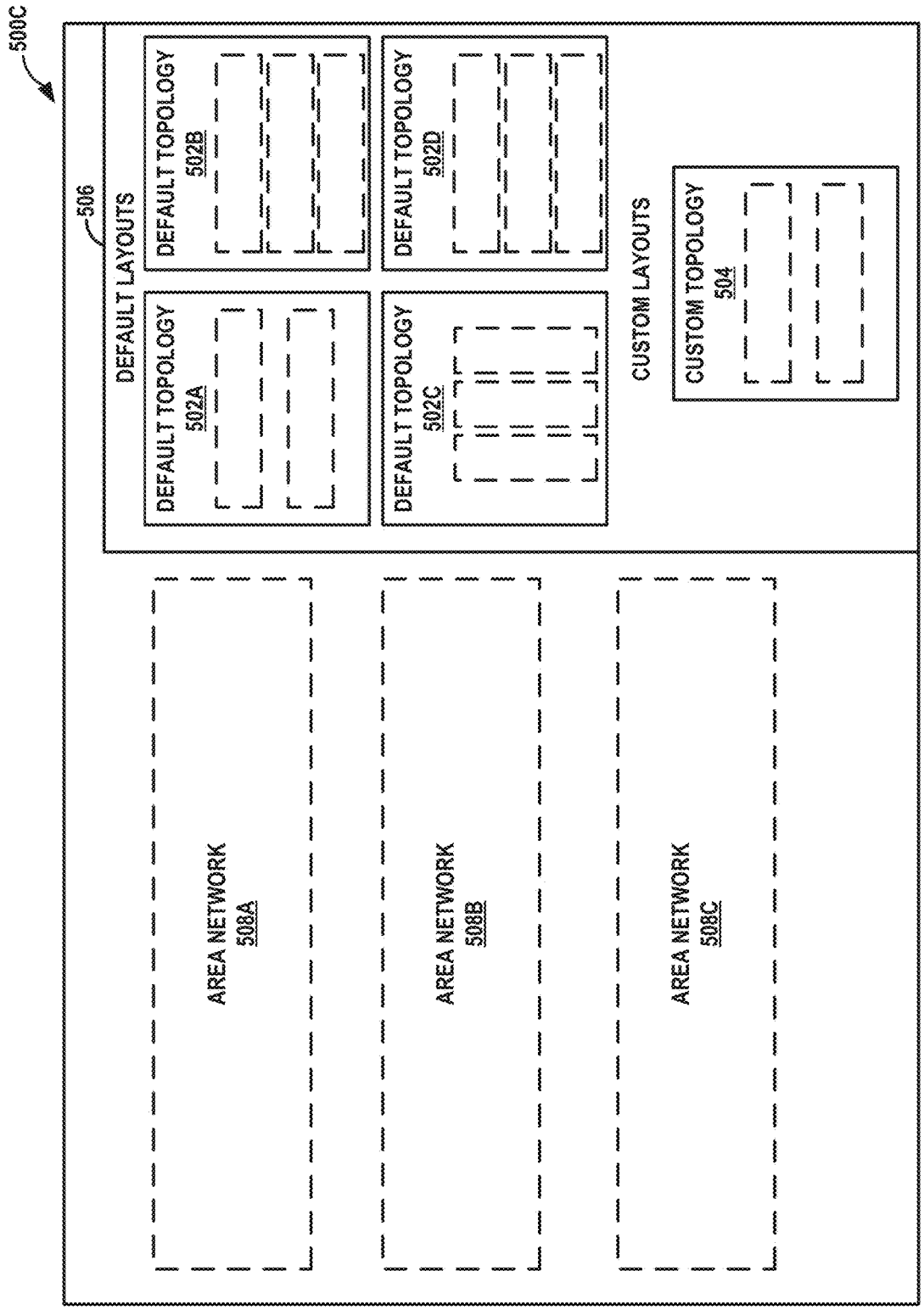

FIGS. 5A-5C are conceptual diagrams illustrating a series of graphical user interfaces 500A-500C showing a sequence of adding a template topology to a network topology, in accordance with the techniques of this disclosure. GUIs 500A-500C may be output for display on a display device, such as display device 48 of FIG. 2. In the GUIs of 500A-500C, layouts window 506 may depict the various templates available as the initial layouts for any network topology. These templates include default topologies 502A-502D, as well as custom topology 504. Default topologies 502A-502D may only implement the rules defined by the service provider, while custom topology may further include user-defined rules.

Default topology 502A may include two horizontal area networks. Default topology 502A may represent a typical WAN/LAN topology. As such, the two horizontal area networks may include one SD-WAN and one LAN.

Default topologies 502B and 502C may be two different examples of demilitarized zone topologies. For instance, default topology 502B may depict each of the three area networks within the demilitarized zone topology as horizontal area networks, while default topology 502C may depict each of the three area networks within the demilitarized zone topology as vertical area networks. In either case, default topologies 502B and 502C may include a trusted network, a demilitarized zone, and an untrusted network.

Default topology 502D may include three horizontal area networks, and may be representative of a datacenter topology. As such, the three horizontal area networks in default topology 502D may include a core network, an aggregation network, and an access network.

Meanwhile, custom topology 504 may be similar to default topology 502A, in that both custom topology 504 and default topology 502A are representative of WAN/LAN topology. However, custom topology may enable user-defined rules for one or more of the SD-WAN or the LAN. As such, with this extra level of restriction, a separate graphic may be included in GUIs 500A-500C to represent the presence of user-defined rules for custom topology 504.

In GUI 500B of FIG. 5B, the computing device outputting GUI 500B has received an indication of user input selecting default topology 502B as the initial layout for the current network topology. In some instances, the sequence of adding default topology 502B to the network topology may include simply receiving a selection of default topology 502B from layouts window 506. In other instances, such as the example of FIG. 5B, the sequence of adding default topology 502B to the network topology may include receiving a selection of default topology 502B and then a drag input from the location of default topology 502B in layouts window 506 into the portion of GUI 500B where the network topology may be depicted.

In GUI 500C of FIG. 5C, the computing device outputting GUI 500C has finalized the selection of default topology 502B as the initial layout for the network topology. Upon completing the selection, the computing device outputting GUI 500C may extract the elements from default topology 502B and place the elements (e.g., area networks 508A-508C), at a larger scale in the network topology area. These elements include, in this example, the trusted network of area network 508A, the demilitarized zone of area network 508B, and the untrusted network of 508C.

Figure 6:
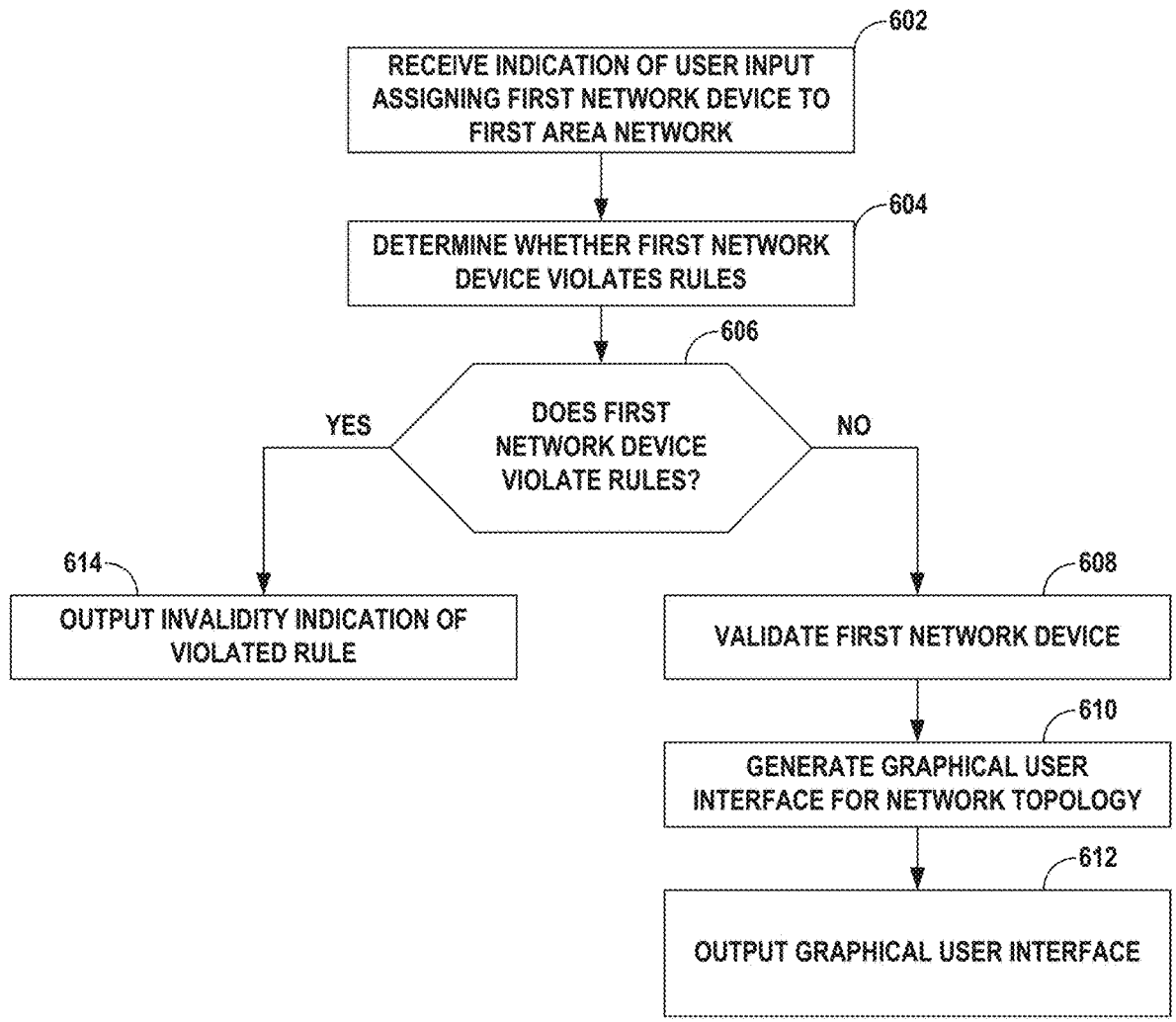
FIG. 6 is a flow diagram illustrating an example technique for a network topology application to validate custom additions to the network topology, in accordance with the techniques of this disclosure.

FIG. 6 is a flow diagram illustrating an example technique for a network topology application to validate custom additions to the network topology, in accordance with the techniques of this disclosure. The example operation may be performed by one of subscriber devices 16 from FIG. 1, or computing device 60 of FIG. 2, for example. The following are steps of the process, although other examples of the process performed in the techniques of this disclosure may include additional steps or may not include some of the below-listed steps.

In accordance with the techniques described herein, I/O engine 58 receives an indication of user input at input component 42 assigning a first network device to a first area network in a network topology (602). Network topology engine 56 determines whether the first network device violates one or more topology rules 64 for the first area network based on characteristics of the first network device, such as location within the network topology, the type of the first network device, and the role of the first network device (604). If the first network device does not violate the one or more topology rules 64 for the first area network ("NO" branch of 606), network topology engine 56 validates the first network device (608). Responsive to network topology engine 56 validating the first network device, I/O engine 58 generates a GUI (610). The GUI includes at least a graphical indication of the first network device and a graphical indication of the first area network. In instances where the first network device is not the only device present in the network topology, the GUI also includes a graphical indication of a second network device in the network topology and a graphical indication of a connection between the first network device and the second network device. I/O engine 58 outputs, for display on display device 48, the GUI (612). Conversely if the first network device does violate the one or more topology rules 64 for the first area network ("YES" branch of 606), I/O engine 58 outputs, for display on display device 48, an invalidity indication of the particular rule violated by the placement of the first network device within the first area network (614).

Figure 7:
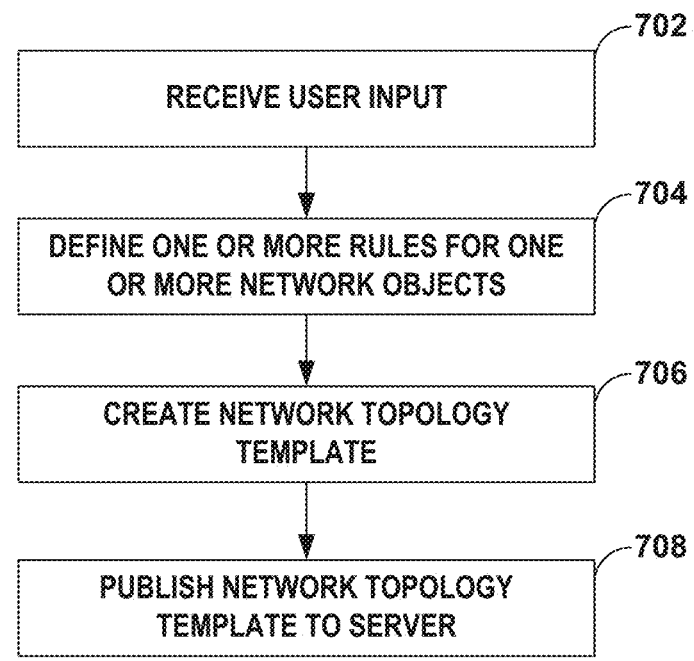
FIG. 7 is a flow diagram illustrating an example technique for a service provider to define rules for various network objects in a network topology application, in accordance with the techniques of this disclosure.

FIG. 7 is a flow diagram illustrating an example technique for a service provider to define rules for various network objects in a network topology application, in accordance with the techniques of this disclosure. The example operation may be performed by computing device 32 from FIG. 1, or computing device 60 of FIG. 2, for example. The following are steps of the process, although other examples of the process performed in the techniques of this disclosure may include additional steps or may not include some of the below-listed steps.

For purposes of example, FIG. 7 is described with respect to operation of computing device 60 of FIG. 2. In accordance with the techniques described herein, I/O engine 58 may receive an indication of user input regarding restrictions or allowances for area networks and/or network devices that may be placed within the area networks when designing a network topology (702). Based on this user input received by I/O engine 58, network topology engine 56 defines one or more rules for each of one or more network objects defining a valid placement within a network topology for the respective network object (704). Network topology engine 56 creates a network topology template including at least one of the one or more network objects (706). I/O engine 58 publishes the network topology template to a server for reference by a network development application (708), thereby storing the template and the corresponding rules on the server for use by a client when the client accesses the network development application to design their networks.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A method comprising:
   receiving, by a computing device, an indication of user input assigning a first network device to a first area network in a network topology;
   detecting a presence of both the first network device and a second network device as being assigned within the network topology;
   determining, by the computing device and based on one or more characteristics of the first network device and one or more characteristics of the second network device, that the first network device and the second network device are connectable network devices;
   determining, by the computing device and based on a set of rules defining different types of connections allowed between two network devices based on characteristics of the two network devices, a first type of connection to place between the first network device and the second network device;
   generating, by the computing device, a graphical user interface that includes at least a graphical indication of the first network device, a graphical indication of the first area network, a graphical indication of a second network device in the network topology, and a graphical indication of a connection between the first network device and the second network device, wherein the graphical indication of the connection between the first network device and the second network device is indicative of the first type of connection; and outputting, by the computing device, and for display on a display device, the graphical user interface.

2. The method of claim 1, further comprising:
determining, by the computing device and based on one or more characteristics of the first area network, one or more rules for the first area network, wherein the one or more rules for the first area network are defined by a service provider.

3. The method of claim 1, wherein the user input comprises a first user input, and wherein the method further comprises:
prior to receiving the indication of the user input, receiving, by the computing device, an indication of a second user input adding the first area network to the network topology.

4. The method of claim 3, wherein the second user input is a selection of one or more of a template network topology or an individual area network from a list comprising a plurality of area networks.

5. The method of claim 1, wherein the user input comprises a first user input, and wherein the method further comprises:
receiving, by the computing device, an indication of a second user input enabling user-defined rules;
receiving, by the computing device, an indication of a third user input defining a first user-defined rule for the first area network; and
setting, by the computing device, the one or more rules for the first area network to include the first user-defined rule.

6. The method of claim 1, wherein the user input comprises a first user input, further comprising:
receiving, by the computing device, an indication of second user input assigning a third network device to the first area network in the network topology;
determining, by the computing device and based on one or more characteristics of the third network device, that the third network device violates one or more rules for the first area network; and
responsive to determining that the third network device violates the one or more rules for the first area network, outputting, by the computing device, and for display on the display device, an invalidity indication of a rule of the one or more rules for the first area network violated by the third network device being assigned to the first area network.

7. The method of claim 1, wherein the user input comprises a first user input, further comprising:
receiving, by the computing device, an indication of second user input defining the set of rules defining different types of connections allowed between two network devices based on characteristics of the two network devices.

8. The method of claim 1, wherein the second network device is assigned to the first area network.

9. The method of claim 1, wherein the second network device is assigned to a second area network in the network topology, the second area network having a type that is different than a type of the first area network.

10. The method of claim 1, wherein the first area network comprises one of a local area network, a wide area network, a software-defined wide area network, a perimeter network, a trusted network, an untrusted network, a core network, an aggregation network, an access network, or an edge network.

11. The method of claim 1, further comprising:
publishing, by the computing device, a diagram of the network topology to a server for physical implementation, the network topology including at least the first network device, the second network device, the first area network, and the connection; and
generating, by the computing device, a bill of materials required for the physical implementation of the network topology.

12. The method of claim 1, further comprising:
saving, by the computing device, the network topology as a template topology.

13. The method of claim 12, wherein the user input comprises a first user input, wherein the network topology comprises a first network topology, and wherein the method further comprises:
receiving, by the computing device, an indication of a second user input selecting the template topology as an initial layout for a second network topology.

14. The method of claim 1, further comprising:
performing, by the computing device, an automatic network discovery to identify one or more available network objects;
for each of the one or more available network objects:
determining, by the computing device, and based on one or more rules associated with the available network object, a valid placement location for the respective available network object within the network topology; and
placing, by the computing device, the available network object at the valid placement location within the network topology;
generating, by the computing device, an updated graphical user interface including at least a graphical indication of each of the one or more available network objects at a respective valid placement location within the network topology; and
outputting, by the computing device, and for display on the display device, the updated graphical user interface.

15. The method of claim 1, wherein the one or more characteristics of the first network device comprise one or more of a device role, a device series, or a device type, and wherein the one or more characteristics are defined by metadata associated with the first network device.

16. A method comprising:
defining, by a computing device, one or more rules for each of one or more network objects defining a valid placement within a network topology for the network object;
defining, by the computing device, one or more rules indicating types of connections allowed between the one or more network objects based on characteristics of the network objects;
creating, by the computing device, a network topology template including at least one of the one or more network objects, the one or more rules for each of the one or more network objects, and the one or more rules for types of connections allowed between the one or more network objects; and
publishing, by the computing device, the network topology template to a server for reference by a network development application.

17. The method of claim 16, wherein a first network object of the one or more network objects comprises an object representing one or more of an area network or a network device.

18. A device comprising:
a memory configured to store one or more rules; and
one or more processors in communication with the memory, the one or more processors configured to:
receive an indication of user input assigning a first network device to a first area network in a network topology;
detect a presence of both the first network device and a second network device as being assigned within the network topology;
determine, based on one or more characteristics of the first network device and one or more characteristics of the second network device, that the first network device and the second network device are connectable network devices;
determine, based on a set of rules defining different types of connections allowed between two network devices based on characteristics of the two network devices, a first type of connection to place between the first network device and the second network device;
generate a graphical user interface that includes at least a graphical indication of the first network device, a graphical indication of the first area network, a graphical indication of a second network device in the network topology, and a graphical indication of a connection between the first network device and the second network device, wherein the graphical indication of the connection between the first network device and the second network device is indicative of the first type of connection; and
output, for display on a display device, the graphical user interface.

* * * * *